Patented Jan. 26, 1943

2,309,263

UNITED STATES PATENT OFFICE 2,309,263

PROCESS FOR THE PRODUCTION OF CATALYSTS

Samuel Benson Thomas, Berkeley, Calif., assignor to Shell Development Company, San Francisco, Calif., a corporation of Delaware No Drawing. Application April 22, 1941,
Serial No. 389,772

10 Claims. (Cl. 252—251)

This invention relates to improved aluminum halide catalysts and the method of their production. A particular embodiment of the invention relates to improved combination catalysts comprising anhydrous aluminum chloride and a process for their production.

The aluminum halides such as, for example, aluminum chloride and aluminum bromide, are extremely active catalysts capable of catalyzing a wide variety of reactions. Aluminum chloride, because of its relatively low cost and commercial availability finds considerable application in the alkylation of hydrocarbons with olefines, the cracking of hydrocarbons, the polymerization of unsaturated hydrocarbons, Friedel-Crafts reactions and the like. In many of these reactions the aluminum chloride is customarily employed per se. In some cases, the aluminum chloride is employed in combination with inert carriers or supporting materials, such as pumice, crushed firebrick, and the like to prevent the aluminum chloride from agglomerating to a hard sticky mass and to produce a catalyst having a fixed physical shape better adapted for use in vapor phase operations. These supported catalysts are usually prepared by simply mixing pieces of carrier material with powdered anhydrous aluminum chloride whereupon the surface of the carrier material becomes coated with the catalyst. Another method for producing supported aluminum chloride catalysts is to press or pill suitable mixtures containing the desired proportion of aluminum chloride and powdered carrier. Of the carrier materials used heretofore, those capable of absorbing aluminum chloride have sometimes been preferred because of their ability to minimize volatilization of the catalyst during operation. Thus it has been proposed to prepare an aluminum chloride catalyst by mixing aluminum chloride and activated carbon and heating under a high pressure of hydrogen. The supported aluminum chloride catalysts of this type are superior to aluminum chloride per se in that they are less prone to sludge and are more suitable for use in vapor phase reactions; in certain cases they are also somewhat more active, due to an increased available catalytic surface. In most respects, however, they do not differ materially from aluminum chloride per se and are usually of about the same order of activity.

It has been found that aluminum halide catalysts of materially enhanced catalytic activity are obtained by combining the aluminum halide with certain solid inorganic materials containing firmly bound or strongly adsorbed water. This, it has been found, is due primarily to a specific promoting action attributable to materials of this type. The degree of activity as well as other desirable characteristics of the resulting catalysts is, however, largely dependent upon the conditions under which the aluminum halide and these active materials are combined. Thus, a certain amount of improvement in catalytic activity may be apparent by simply mechanically mixing the aluminum halide and one of a select few of these materials most effective in their promoting ability. It is found, however, that the promotion action of carrier materials of this type is considerably more pronounced and superior catalysts result if the aluminum halide is combined with them by suitable hot methods. Thus, it has been found that superior catalysts may be prepared by fusing the aluminum halide with the water-containing carrier, cooling, and breaking up the resultant cake. Such catalysts, however, contain an excess of aluminum halide and tend, like the aluminum halides per se, to volatilize appreciably when employed at even moderately elevated temperatures. Furthermore, it was later found that the promoting effect is more pronounced when the pores of carrier material are not completely clogged by excessive amounts of aluminum halide. The present practice in producing such catalysts is to mix an appropriate amount of aluminum halide (not substantially in excess of that required to completely saturate the carrier) with a suitable adsorptive carrier containing firmly-bound water and heat the mixture in a closed vessel (to avoid the loss of aluminum halide by volatilization) until the total aluminum halide applied is adsorbed in the carrier. The charge is then cooled, any pressure released, and the granular catalyst is removed, ready for use. Catalysts prepared in this manner are quite good and much superior to the various conventional aluminum halide catalysts. Thus, they are very active (for instance, a catalyst prepared in the described manner with an adsorptive alumina and containing 17% to 23% aluminum chloride is approximately twice as active as a catalyst prepared in the same manner with an activated carbon carrier and containing even much larger percentages of aluminum chloride): Furthermore, they hold the aluminum halide very tenaciously and lose very little aluminum halide by volatilization, even when employed at temperatures considerably in excess of the normal boiling point of the aluminum chloride. During prolonged use they gradually decline in catalytic activity as is, of course, to be expected. I have noticed, however, that the loss of catalytic activity is not apparently due to any appreciably extent to volatilization of the aluminum halide nor to the deposition of tar and sludges on the catalyst, as would normally be expected since very little catalyst loss is observed, and the spent catalyst is sometimes light-colored and substantially unchanged in appearance. I have now found that the decline in the catalytic activity of catalysts prepared in this manner is due in part to the presence in the catalysts of aluminum halide hydrates which when employing the catalysts decompose to form alumina and the hydrogen halide. I have furthermore found that if the formation of these aluminum halide hydrates is prevented or decomposed during the preparation of the catalyst, the promoting effect of these water-containing carrier materials may be preserved and at the same time more active catalysts, which decline in activity at a slower rate and therefore retain a satisfactory activity for a longer period of time, may be produced.

In accordance with the process of the invention, these superior substantially anhydrous aluminum halide catalysts (that is, catalysts containing no substantial quantity of aluminum halide hydrates) with carrier materials containing bound water may be economically and efficiently prepared by the novel two-step method more fully described hereinbelow.

The process of my invention comprises the steps of reacting a suitable inorganic carrier material containing bound water with an amount of aluminum halide insufficient to saturate the carrier material at a temperature above about 140° C., removing hydrogen halide formed by the reaction of the aluminum halide with water in the carrier, thereby causing the decomposition of aluminum halide hydrates, and then impregnating the product so formed with an additional quantity of aluminum halide to produce a catalyst having the desired concentration of aluminum halide.

Suitable solid inorganic materials containing bound water which may be combined with the aluminum halide in accordance with the process of the invention comprise those solid inorganic materials containing bound water which can be partially dehydrated by heating at moderately elevated or high temperatures, for instance, above about 200° C. Preferred carrier materials of this class are those containing relatively firmly-bound water of hydration or water of crystallization. Thus, it is usually preferred to first dry and partially dehydrate many carrier materials to such an extent that they are not substantially further dehydrated by heating at temperatures below 250° C. to 300° C. but still contain an appreciable amount, for instance, 2% to 10%, of water which may be removed by more drastic conditions. It is specifically pointed out that the material is not to be completely dehydrated in this step.

Attempts to prepare anhydrous aluminum halide catalysts by completely or substantially completely dehydrating the inorganic material at high temperatures before combining them with the aluminum halide lead to formation of catalysts which are in no way comparable with those prepared by the process of the invention, as complete dehydration causes them to lose a substantial part of their ability to adsorb the aluminum halide. This is illustrated by the following example.

*Example I*

Separate portions of an adsorptive alumina were dehydrated to different degrees of water content. The separate portions of partially dehydrated alumina were then impregnated with aluminum chloride under identical conditions of temperature and pressure. It was found that the material which had been dehydrated at a temperature of 750° C. to reduce the water content to 0.5% was capable of adsorbing only 70% as much aluminum chloride as the corresponding material which had been dehydrated at a temperature of 350° C. to a water content of 6.9%.

Solid inorganic materials which are suitable constituents of the catalyst combinations of the invention by virtue of the fact that they contain small amounts of bound water which can be removed only by heating at temperatures higher than the maximum temperatures to which they are subjected in preparing the catalysts, comprise the aluminous and/or silicious adsorptive materials of natural or synthetic origin which contain a small amount of firmly bound or strongly adsorbed water, such as, for example, the natural-occurring minerals and clays, such as pipe clay, fuller's earth, bentonite, kaolin, Florida earth, meerschaum, infusorial earth, kieselguhr, diatomaceous earth, montmorillonite, the zeolites, and the like; the various treated clays and clay-like materials; and artificially prepared materials such as activated alumina, artificial permutites and the like. These materials described above are preferably, but not necessarily, partially dehydrated and/or activated by heating in a drying atmosphere at a temperature higher than that at which they are combined with the aluminum halide until they substantially cease to give off water. Of these various available inorganic carrier materials containing bound water, I prefer to employ those having an appreciable adsorptive ability (that is activated carrier materials) since such materials are capable of adsorbing greater quantities of aluminum halide and thus produce catalysts of greater activity and longer active life which have lower vapor pressures at elevated temperatures. Adsorptive aluminas, especially adsorptive aluminas containing substantial amounts of alumina alpha monohydrate are particularly effective.

Although it is in no wise intended to limit the invention by the soundness or accuracy of any theories advanced herein to explain the advantageous results obtained when utilizing the solid inorganic materials of this type, it is believed that the water originally inherent in these materials functions in some manner to activate the final product. This may be due to the presence in the material of the water itself, but more likely is due to surface conditions resulting in part from the reaction of firmly-bound water with the anhydrous aluminum halide at the conditions under which the catalyst combinations are prepared. If desired, any of the common inert catalyst carriers such, for instance, as crushed coke, crushed brick, pumice, porcelain chips, majolica chips, chamotte, activated charcoal, asbestos, and the like may be used in conjunction with one or more of the above-mentioned more active materials.

Of the available aluminum halides which may be combined with the carrier materials of the type described above, aluminum chloride is preferred. Though aluminum bromide produces catalysts which are usually even more active than those prepared from aluminum chloride, it is considerably more expensive. It may often be economically employed nevertheless for certain purposes. Particularly, active catalyst may be prepared, for example, with a mixture of aluminum halide such as a mixture of aluminum chloride and aluminum bromide.

In order to prepare catalysts having the optimum activity the aluminum halide and promoting carrier are combined in certain preferred proportions. It is found that if the ratio of aluminum halide to carrier material is quite low exceptionally stable catalysts having a comparatively low order of activity are obtained. These are not usually preferred but may find advantageous application in certain processes wherein the tendency to undergo side reactions is particularly pronounced. On the other hand, it is found that large proportions of the aluminum halides likewise give less desirable catalysts. When the proportion of aluminum halide combined with the carrier is too large not only is the promoting effect of the specified carriers masked but the catalysts exhibit higher vapor pressures. The optimum amount of aluminum halide to be combined with the active carrier depends primarily upon the particular carrier material and also to some extent upon the particular aluminum halide employed and the use for which the catalyst is intended.

The optimum proportion of aluminum halide is found to be dependent upon certain characteristics of the particular solid inorganic material employed. Thus, the amount of aluminum chloride to be combined with a particular solid inorganic material to realize the maximum promoting effect depends upon the available surface in the material and varies in general between about 8% and about 28%. A material which has a large inner surface may require as much as about 28% of aluminum chloride, whereas certain adsorptive clays may require as little as about 8%. The majority of the active solid inorganic materials, however, give optimum results when the amount of aluminum chloride is between these extremes. Thus, the best catalysts prepared by combining aluminum chloride and activated alumina, for example, contain between about 15% and about 28% and preferably between 17% and 23% of aluminum chloride. When aluminum bromide is employed, these concentrations are generally slightly lower.

The amount of aluminum halide added to the carrier material in the first step of the catalyst preparation depends to a certain degree upon the particular inorganic material used and the water content thereof. It is preferably at least the stoichiometrical equivalent of the water in the carrier material and preferably less than sufficient to completely saturate the carrier material. In the preparation of catalyst combinations with a partially dehydrated activated alumina containing, for example, about 5 per cent of water, an initial amount of aluminum halide equal to about 15 to 20 per cent by weight of the alumina charge is quite suitable. The resulting mixture is heated at a temperature sufficiently high to cause the reaction of the aluminum halide with the bound water in the carrier, for example, a temperature in excess of 140° C. Temperatures above about 350° C. although applicable, are not necessary. A suitable temperature range which may be advantageously employed with most of the carrier materials of the above-described type is, for example, between about 150° C. and about 250° C. The reaction of the aluminum halide with the bound water in the carrier during this phase of the process is accompanied by the evolution of the corresponding hydrogen halide. The presence of the evolved hydrogen halide in the reaction zone favors the formation of, and hinders the decomposition of aluminum halide hydrates in the catalyst. If the liberated hydrogen halide is not removed from the reaction zone, appreciable quantities of these hydrates are formed. In the hitherto employed method of impregnating carriers with aluminum halide wherein the total quantity of aluminum halide is combined with the carrier in a single step the removal of the liberated hydrogen halide would not be practical even if it were thought advisable due to the fact that removal of the liberated hydrogen halide would entail the loss of considerable quantities of the aluminum halide. In the process of the present invention, the formation of appreciable quantities of hydrates is avoided by removing liberated hydrogen halide from the reaction zone. This may be accomplished according to the process of the invention without substantially cooling the mixture and without substantial loss of aluminum halide since the aluminum halide is added in this step in an amount insufficient to saturate the carrier material and is, therefore, substantially all combined with the carrier and rendered relatively non-volatile. In fact, in the preferred embodiment of the invention, the removal of liberated hydrogn halide is effected while the catalyst mixture is at a temperature of at least about 140° C. At lower temperatures, the aluminum halide hydrates decompose only very slowly. Consequently, if the reaction mixture is cooled to substantially below 140° C. before liberated hydrogen halide is removed the substantial quantities of aluminum halide hydrate formed remains in the catalyst. Liberated hydrogen halide may be removed from the reaction mixture either intermittently or continuously. A preferred method of operation is to heat the mixture of aluminum halide and carrier material in a closed container and then maintain a suitable moderately elevated pressure by the intermittent or continuous release of the liberated hydrogen halide. A critrion of a suitable pressure range is the steady evolution of the gaseous reaction products comprising hydrogen halide, indicative of the formation of the desired product. Thus, in the production of a catalyst combination comprising anhydrous aluminum chloride and alumina excellent results are achieved by the maintenance of pressures in the approximate range of 25 to 100 lbs. gauge. When employing aluminum chloride, pressures of at least 2½ atmospheres absolute, for instance 40 to 75 lbs./sq. in. are somewhat preferred.

Without intention of limiitng the invention in any wise by the soundness or accuracy of any theory advanced herein to explain the improved results obtained by the process of the invention, it is believed that, under the conditions at which the solid inorganic material is combined with the aluminum halide, the aluminum halide reacts with at least a part of the firmly-bound water of the solid inorganic material to form aluminum halide hydrates. At atmospheric pressure these compounds normally tend to decompose in the temperature range of from 125° C. to 200° C., but in the presence of a sufficiently high hydrogen halide pressure, such as that produced when heating and cooling the mixture in a closed reaction vessel, the aluminum halide hydrates are stable at temperatures even as high as about 225° C. Thus, it has been noticed that the products obtained by heating and then cooling mixtures of anhydrous aluminum chloride and alumina carriers which have been partially dehydrated at a temperature above about 375° C., in a closed bomb, contain appreciable amounts of water in the form of aluminum chloride hydrates. In the process of the invention wherein liberated hydrogen halides are removed, the aluminum halide hydrates are decomposed with the formation of alumina and the corresponding hydrogen halide. The formation of this alumina may well contribute to the high activity of the resulting anhydrous reaction product. The maintenance of the moderately elevated pressure, on the other hand, minimizes any loss of aluminum halide with the gaseous reaction products by favoring the adsorption of aluminum halide by the carrier and also minimizes the small loss of aluminum halide which might be incurred when venting the hydrogen halide. The entirely different nature of the desired catalysts, obtained by combining the aluminum halide and the solid inorganic material in accordance with the process of the invention, and the undesired products obtained by heating and cooling these materials in identical proportions in closed vessels is apparent on observing their behavior under the application of heat. Upon heating the latter products, hydrogen halide and water are first liberated. The immediate liberation of hydrogen halide and water upon heating is apparently the result of the decomposition of aluminum halide hydrates. Such behavior of a catlayst in use reduces the aluminum halide content and results in a more rapid rate of catalyst decline. Upon heating the catalysts prepared by the process of the invention, a small amount of hydrogen halide is first liberated, then aluminum halide vapors, and water is not evolved until evolution of aluminum halide vapors has substantially ceased.

The initial heating of the aluminum chloride and activated alumina is continued until the tendency to generate further pressure as a result of the formation of gaseous reaction products has ceased or has been reduced to a negligible extent. The resulting substantially anhydrous catalytic reaction product is then cooled. This product can, if desired, be used as a final catalyst product. However, since a considerable part of the aluminum halide has reacted with constituents of the solid inorganic material, the aluminum halide content of this product will generally be below the optimum amount. In accordance with the preferred method of preparing the most advantageous catalysts of the invention, additional anhydrous aluminum halide is added in an amount sufficient not only to replace the aluminum halide consumed by reaction, but to raise the aluminum halide content of the final catalyst combination to the desired amount. The mixture is thereupon heated at a temperature which may equal, but which is preferably below, the maximum temperature of the initial heating. Thus, the second heating step may suitably be carried out at a temperature in the approximate range of from 200° C. to 250° C. Since the materials treated in the second phase of the process are substantially anhydrous, this step may be carried out in a closed vessel without tendency to generate pressures above that exerted by the aluminum halide vapors. The second heating is continued to effect the substantially complete adsorption of the added aluminum halide into the anhydrous reaction product obtained from the first phase of the process.

Upon cooling the products, after each of the two heating steps of the process, the pressure is preferably reduced to atmospheric pressure at a temperature above about 140° C., for example at the temperature of approximately 150° C., before further substantial cooling.

The advantages of the novel process of preparing the aluminum halide catalysts are several and important. The process permits the combination of the aluminum halide and the solid inorganic materials containing firmly-bound water under conditions enabling the maximum utilization of the promoting effect of these materials. It furthermore enables the combination of these catalyst components under conditions which produce a substantially anhydrous catalyst of improved activity and unusual stability. The substantially anhydrous, highly active catalysts produced by means of the process of the invention greatly mitigate such difficulties as corrosion, clogging of apparatus, generation of pressure in storage and shipping containers, etc., which difficulties are notably inherent in catalysts prepared by combining aluminum halide and the active water-containing inorganic materials by processes utilized heretofore.

The process of the invention may be carried out in any suitable apparatus preferably providing adequate means for mixing the constituents during preparation. Suitable apparatus comprises a heated rotating drum equipped with adequate means for introducing and removing charge therefrom and means for the continuous or intermittent removal of gaseous reaction products.

The following example is given for the purpose of illustrating the process of the invention and the highly advantageous true catalyst combinations thereby produced:

*Example II*

280 grams of an activated bauxite was partially dehydrated by heating in the temperature range of 375°–400° C. to a water content of 6.5 per cent as determined by loss in weight upon ignition. A quantity of this material containing an appreciable proportion of alumina alpha monohydrate was charged to a reaction vessel along with anhydrous aluminum chloride in the amount of 15.45 per cent by weight of the total ultimate charge. The vessel was closed and heated for a period of about seven hours at a temperature of 250° C. As soon as the temperature attained 200° C., gaseous reaction products comprising hydrogen chloride were vented from the vessel. The venting was continued throughout the remainder of the heating period. The maximum pressure to which the contents of the vessel were subjected was 60 lbs. gauge. At the end of the seven hour period, the evolution of hydrogen chloride became negligible and the vessel and contents were cooled to 100° C. Additional aluminum chloride in an amount equal to 12.35 per cent of the total ultimate charge was added to the reaction product of the first heating. The heating and rotation of the vessel was then resumed. The second heating was continued for a period of 4 hours at a maximum temperature of 215° C. The vessel was kept sealed during the second heating and the maximum pressure attained was 60 lbs. gauge. At the end of this period, the vessel was alowed to cool and when the product had cooled to a temperature of 150° C. the vessel was vented to atmospheric pressure.

The resulting catalyst combination contained 19 per cent of anhydrous aluminum chloride, and had excellent catalytic properties. It was of unusual stability and did not give off water when heated.

Due to their high activity, their catalytic and physical stability and reasonable cost, the catalysts of the invention may be applied with good advantage to the many catalytic processes, particularly hydrocarbon conversion processes, wherein aluminum chloride catalysts have been used heretofore. The effectiveness of the novel catalyst combination in catalyzing the isomerization of hydrocarbons is illustrated by the following example:

*Example III*

A mixture consisting of 97 mol per cent butane and 3 mol per cent hydrogen chloride was passed continuously over a catalyst prepared as described in Example II at the rate of 11.7 mols of charge per liter of catalyst per hour at a temperature of 100° C. and a pressure of 150 lbs. per sq. in. The isobutane content of the product initially obtained amounted to 62 mol per cent. The operation was continued for a period of 208 hours during which period an average conversion to isobutane of 41.2 per cent was obtained.

The same catalyst was then used without prior activation to treat a mixture consisting of 85 mol per cent of butane and 15 mol per cent of hydrogen chloride for an additional period of 74 hours at 100° C. and 150 lbs. per sq. in. and at a feed rate of 9.9 mols per liter of catalyst per hour. Under these operating conditions, an average conversion to isobutane of 42.4 per cent was obtained for the 74 hour period. After a total of 282 hours of continuous operation with the same catalyst a conversion to isobutane of 32 per cent was still being obtained.

I claim as my invention:

1. A process for the production of improved aluminum chloride catlysts which comprises heating an adsorptive alumina containing bound water at a temperature above about 140° C. and at a moderately elevated pressure in a closed vessel with sufficient aluminum chloride to react with at least a substantial amount of the bound water in said adsorptive alumina but insufficient to saturate said adsorptive alumina thereby causing an increase in pressure, venting hydrogen chloride formed by the reaction at a temperature above about 140° until said pressure is restored and the decomposition of alumium chloride hydrates is effected, and impregnating the product so formed with a second portion of aluminum chloride in an amount sufficient to produce a catalyst combination containing between 17% and 23% aluminum chloride.

2. A process for the production of improved aluminum halide catalysts which comprises heating an adsorptive alumina containing bound water at a temperature above about 140° C. and at a moderately elevated pressure in a closed vessel with sufficient aluminum halide to react with at least a substantial amount of the bound water in said adsorptive alumina but insufficient to saturate said adsorptive alumina thereby causing an increase in pressure, venting hydrogen halide formed by the reaction at a temperature above about 140° C. until said pressure is restored and the decomposition of aluminum halide hydrates is effected, and impregnating the product so formed with a second portion of aluminum halide in an amount sufficient to produce a catalyst combination containing between 17% and 23% aluminum halide at a temperature above about 140° C.

3. A process for the production of aluminum halide catalysts which comprises heating an adsorptive alumina containing bound water at a temperature above about 140° C. and at a moderately elevated pressure in a closed vessel with sufficient aluminum halide to react with at least a substantial amount of the bound water in said adsorptive alumina but insufficient to saturate said adsorptive alumina thereby causing an increase in pressure, venting hydrogen halide formed by the reaction at a temperature above about 140° C. until said pressure is restored and the decomposition of aluminum halide hydrates is effected and impregnating the product so formed with a second portion of aluminum halide in an amount sufficient to produce a catalyst combination containing between 17% and 23% aluminum halide.

4. A process for the production of improved aluminum halide catalysts which comprises heating an adsorptive alumina consisting largely of alumina alpha monohydrate at a temperature above about 140° C. and at a moderately elevated pressure in a closed vessel with sufficient aluminum halide to react with at least a substantial amount of the bound water in said adsorptive alumina but insufficient to saturate said adsorptive alumina, thereby causing an increase in pressure, venting hydrogen halide formed by the reaction at a temperature above about 140° C. until said pressure is restored and the decomposition of aluminum hydrates is effected, and impregnating the product so formed with a second portion of aluminum halide in an amount sufficient to produce a catalyst combination containing between 17% and 23% aluminum halide.

5. A process for the production of improved aluminum halide catalysts which comprises heating an adsorptive inorganic carrier material containing bound water at a temperature above about 140° C. and at a moderately elevated pressure in a closed vessel with sufficient aluminum halide to react with at least a substantial amount of the bound water in said adsorptive material but insufficient to saturate said adsorptive material thereby causing an increase in pressure, venting hydrogen halide formed by the reaction at a temperature above about 140° C. until said pressure is restored and the decomposition of aluminum halide hydrates is effected, and impregnating the product so formed with a second portion of aluminum halide in an amount sufficient to produce a catalyst combination containing between 17% and 23% aluminum halide.

6. A process for the production of improved aluminum chloride catalysts which comprises heating an adsorptive alumina containing bound water at a temperature above about 140° C. and a pressure of at least 2½ atmospheres absolute in a closed vessel with sufficient aluminum chloride to react with at least a substantial amount of the bound water in said adsorptive alumina but insufficient to saturate said adsorptive alumina thereby causing an increase in pressure, venting hydrogen chloride formed by the reaction at a temperature above about 140° C. until said pressure is restored and decomposition of aluminum hydrates is effected and impregnating the product so formed with a second portion of aluminum chloride in an amount sufficient to produce a catalyst combination containing between 17% and 23% aluminum chloride.

7. A process for the production of improved aluminum chloride catalysts which comprises heating an adsorptive alumina containing bound water at a temperature above about 140° C. in a closed vessel with sufficient aluminum chloride to react with at least a substantial amount of the bound water in said adsorptive alumina but insufficient to saturate said adsorptive alumina, thereby causing an increase in pressure, venting hydrogen chloride formed by the reaction to maintain a relatively constant pressure of at least 2½ atmospheres absolute during said heating until decomposition of aluminum chloride hydrates is effected, and impregnating the product so formed with a second portion of aluminum chloride in an amount sufficient to produce a catalyst combination containing between about 17% and 23% aluminum chloride.

8. A process for the production of improved aluminum halide catalysts which comprises heating an adsorptive alumina containing bound water at a temperature above about 140° C. and at a moderately elevated pressure in a closed vessel with sufficient aluminum halide to react with at least a substantial amount of the bound water in said adsorptive alumina but insufficient to saturate said adsorptive alumina thereby causing an increase in pressure, venting hydrogen halide formed by the reaction at a temperature above about 140° C. until said pressure is restored and the decomposition of aluminum halide hydrates is effected, and impregnating the product so formed with a second portion of aluminum halide in an amount sufficient to substantially saturate the catalyst.

9. A process for the production of improved aluminum chloride catalysts which comprises heating an adsorptive alumina containing bound water in a closed vessel at a temperature above about 140° C. and a pressure of at least 2½ atmospheres absolute with sufficient aluminum chloride to react with at least a substantial amount of the bound water in said adsorptive alumina but insufficient to saturate said adsorptive alumina thereby causing an increase in pressure, venting hydrogen chloride formed by the reaction at a temperature above about 140° C. until said pressure is restored and decomposition of aluminum hydrates is effected, and impregnating the product so formed with a second portion of aluminum chloride.

10. A process for the production of improved aluminum halide catalysts which comprises heating an adsorptive inorganic carrier material containing bound water in a closed vessel at a temperature above about 140° C. and at a moderately elevated pressure with sufficient aluminum halide to react with at least a substantial amount of the bound water in said adsorptive material but insufficient to saturate said adsorptive material thereby causing an increase in pressure, venting hydrogen halide formed by the reaction at a temperature above about 140° C. until said pressure is restored and decomposition of aluminum halide hydrates is effected, and impregnating the product so formed with a second portion of aluminum halide.

SAMUEL BENSON THOMAS.